United States Patent
Wang et al.

(10) Patent No.: US 11,762,743 B2
(45) Date of Patent: Sep. 19, 2023

(54) TRANSFERRING TASK DATA BETWEEN EDGE DEVICES IN EDGE COMPUTING

(71) Applicant: International Business Machines Corporation, Armonk, NY (US)

(72) Inventors: Yue Wang, Beijing (CN); Jing Xing, Beijing (CN); Jian Fang Zhang, Beijing (CN); Da Li Liu, Beijing (CN); Juan Liu, Beijing (CN); Yong Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/359,750

(22) Filed: Jun. 28, 2021

(65) Prior Publication Data
US 2022/0413974 A1    Dec. 29, 2022

(51) Int. Cl.
*G06F 11/20*    (2006.01)

(52) U.S. Cl.
CPC ........ *G06F 11/203* (2013.01); *G06F 11/2025* (2013.01); *G06F 2201/85* (2013.01)

(58) Field of Classification Search
CPC ............... G06F 11/203; G06F 11/2025; G06F 2201/85
See application file for complete search history.

(56) References Cited

U.S. PATENT DOCUMENTS 5,822,512 A * 10/1998 Goodrum ............ G06F 11/2038
714/E11.073
7,543,174 B1 * 6/2009 van Rietschote ... G06F 11/2025
709/224

(Continued)

FOREIGN PATENT DOCUMENTS

CN    108337691 A    7/2018
CN    108499100 A    9/2018

(Continued)

OTHER PUBLICATIONS

IBM Business Automation Workflow/19.x/ Glossary, https://www.ibm.com/docs/en/baw/19.x?topic=v19003-glossary, retrieved from the Internet on Dec. 16, 2022, Original 2018, Updated Mar. 2021 (Year: 2021).*

(Continued)

*Primary Examiner* — Matthew M Kim
*Assistant Examiner* — Indranil Chowdhury
(74) *Attorney, Agent, or Firm* — Brian M. Restauro

(57) ABSTRACT

Edge device task management by receiving an indicator corresponding to a first container running a task on a first edge device of a cluster of edge devices, wherein the indicator indicates an error status of the first container, and wherein task data of the task is stored in a first local storage of the first edge device, selecting a second edge device from the cluster of edge devices, wherein a second container on the second edge device is to run the task, instructing the first and second edge devices to transfer the task data from the first local storage of the first edge device to a second local storage of the second edge device, and in response to receiving a notification that indicates the task data has been transferred from the first local storage to the second local storage, sending the task to the second container.

20 Claims, 7 Drawing Sheets

(56) References Cited

U.S. PATENT DOCUMENTS

| | | | | |
|---|---|---|---|---|
| 7,823,153 | B1* | 10/2010 | Pashenkov | G06F 11/2097 717/148 |
| 9,485,197 | B2 | 11/2016 | Dutta | |
| 10,289,353 | B2 | 5/2019 | Ramakrishnan | |
| 10,445,197 | B1* | 10/2019 | Harpreet | G06F 11/2023 |
| 10,555,146 | B2 | 2/2020 | Zhu | |
| 10,592,345 | B2 | 3/2020 | Helleren | |
| 2004/0210898 | A1* | 10/2004 | Bergen | G06F 11/203 718/100 |
| 2006/0190766 | A1* | 8/2006 | Adler | G06F 11/2033 714/E11.073 |
| 2008/0201523 | A1* | 8/2008 | Ash | G06F 11/2092 711/E12.04 |
| 2012/0311377 | A1* | 12/2012 | Blood | G06F 11/00 714/4.12 |
| 2013/0212212 | A1 | 8/2013 | Addepalli | |
| 2013/0286942 | A1 | 10/2013 | Bonar | |
| 2015/0234719 | A1* | 8/2015 | Coronado | G06F 3/06 714/6.3 |
| 2015/0347244 | A1* | 12/2015 | Blood | G06F 11/1474 714/16 |
| 2016/0004609 | A1* | 1/2016 | Knight | G06F 11/2033 714/4.12 |
| 2016/0070624 | A1* | 3/2016 | Prasad | G06F 3/0683 714/19 |
| 2016/0246867 | A1* | 8/2016 | Bourbonnais | G06F 11/2025 |
| 2017/0212783 | A1 | 7/2017 | Choi | |
| 2019/0098474 | A1 | 3/2019 | Zhu | |
| 2019/0163493 | A1* | 5/2019 | Dubeyko | G06F 9/5005 |
| 2020/0076875 | A1 | 3/2020 | Sabella | |
| 2020/0326976 | A1 | 10/2020 | Wang | |
| 2021/0004270 | A1* | 1/2021 | Singh | H04L 67/125 |
| 2021/0006636 | A1* | 1/2021 | Koehler | H04L 41/0806 |
| 2021/0044646 | A1* | 2/2021 | Guim Bernat | G06F 9/45558 |
| 2021/0124617 | A1* | 4/2021 | Choi | G06F 9/5072 |
| 2021/0144517 | A1* | 5/2021 | Guim Bernat | G06F 9/4881 |
| 2021/0342200 | A1* | 11/2021 | Gupta | G06F 1/08 |
| 2021/0382798 | A1* | 12/2021 | Ganesan | H04L 43/0876 |
| 2022/0050858 | A1* | 2/2022 | Karr | G06F 16/1748 |
| 2022/0091771 | A1* | 3/2022 | Freilich | G06F 3/0604 |
| 2022/0129303 | A1* | 4/2022 | Wang | G06F 11/2028 |
| 2022/0129306 | A1* | 4/2022 | Wang | G06F 9/5083 |
| 2022/0141151 | A1* | 5/2022 | He | H04L 47/781 709/226 |
| 2022/0164223 | A1* | 5/2022 | Llamas Virgen | G06F 11/3692 |

FOREIGN PATENT DOCUMENTS

| | | |
|---|---|---|
| CN | 108958916 A | 12/2018 |
| CN | 112272239 A | 1/2021 |
| EP | 0154551 A2 * | 9/1985 |
| WO | 2017206001 A1 | 12/2017 |
| WO | 2021093535 A1 | 5/2021 |
| WO | WO-2022061587 A1 * | 3/2022 |

OTHER PUBLICATIONS

Chen, M., et al., "A Dynamic Service-Migration Mechanism in Edge Cognitive Computing", ACM Transactions on Internet Technology, Aug. 2018, 15 pgs., <https://dl.acm.org/doi/10.1145/3239565>.

Wang, Y., et al., "An energy saving based on task migration for mobile edge computing", EURASIP Journal on Wireless Communications and Networking, 2019, 11 pgs., <https://link.springer.com/article/10.1186/s13638-019-1469-2>.

Mell et al., "The NIST Definition of Cloud Computing", National Institute of Standards and Technology, U.S. Department of Commerce, NIST Special Publication 800-145, Sep. 2011, 7 pages.

"Patent Cooperation Treaty PCT Notification of Transmittal of the International Search Report and the Written Opinion of the International Searching Authority, or the Declaration", Applicant's file reference PF220383PCT, International application No. PCT/CN2022/100352, International filing date Jun. 22, 2022 (Jun. 22, 2022), dated Aug. 25, 2022, (dated Jun. 22, 2022) 9 pages.

* cited by examiner

TRANSFERRING TASK DATA BETWEEN EDGE DEVICES IN EDGE COMPUTING

BACKGROUND

The disclosure relates generally to edge computing. The disclosure relates particularly to transferring task data from one edge device to another in edge computing.

Edge computing is a distributed computing framework that brings applications closer to data sources, such as, for example, Internet of Things (IoT) devices, local edge servers, etc. This proximity to data at data source can deliver benefits, such as, for example, increased response speed and increased bandwidth availability.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable edge device task management.

Aspects of the invention disclose methods, systems and computer readable media associated with edge device task by receiving an indicator corresponding to a first container running a task on a first edge device of a cluster of edge devices, wherein the indicator indicates an error status of the first container, and wherein task data of the task is stored in a first local storage of the first edge device, selecting a second edge device from the cluster of edge devices, wherein a second container on the second edge device is to run the task, instructing the first and second edge devices to transfer the task data from the first local storage of the first edge device to a second local storage of the second edge device, and in response to receiving a notification that indicates the task data has been transferred from the first local storage to the second local storage, sending the task to the second container of the second edge device.

According to a second aspect of the present invention disclosure, there is provided a system. The system comprises a first component with at least one processing unit in a cloud computing environment and a memory coupled to the at least one processing unit and storing instructions thereon. The instructions, when executed by the processing unit, perform actions of the above method.

According to a third aspect of the present invention disclosure, there is provided a computer program product comprising a computer-readable storage medium having program instructions embodied therewith. The program instructions are executable by a first component with at least one processing unit in a cloud computing environment to cause the at least one processing unit to perform actions of the above method.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
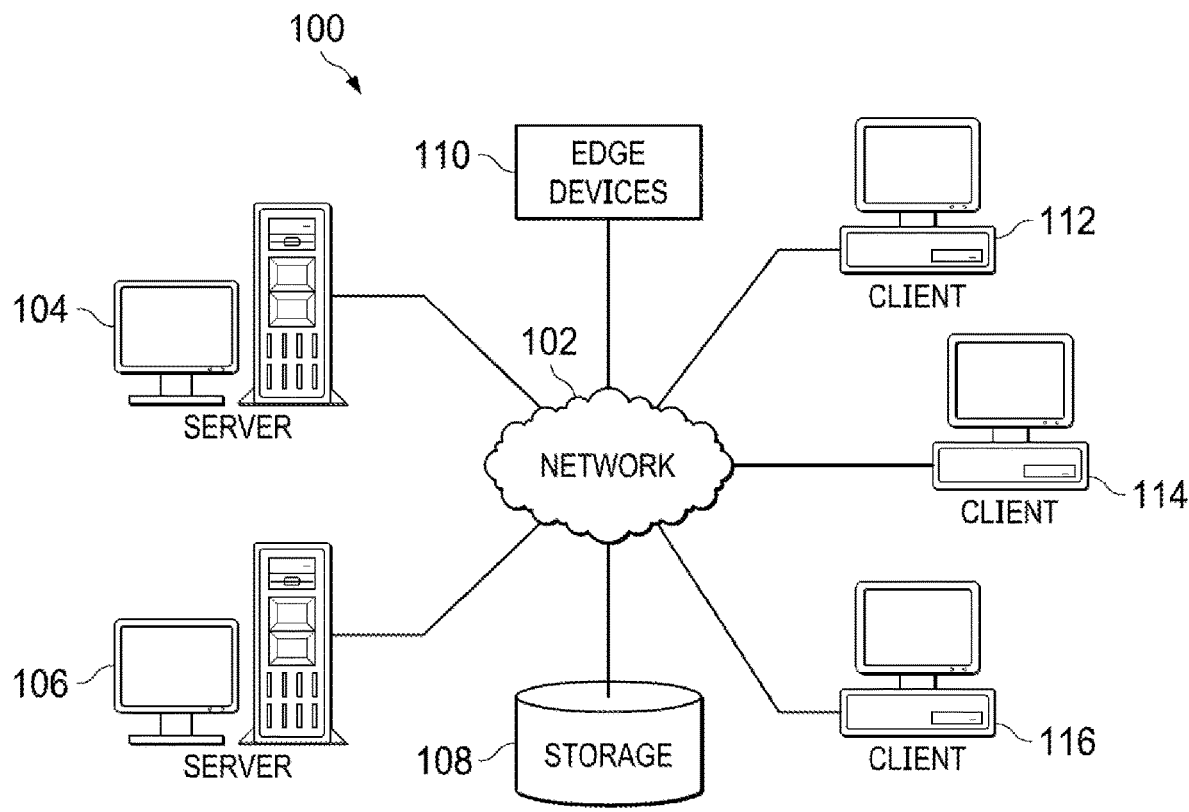
FIG. 1 provides a schematic illustration of a computing environment, according to an embodiment of the invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

The increase in the number of Internet of Things (IoT) devices at the edge of a network is producing a massive amount of data to be computed at data centers, pushing network bandwidth requirements to their limits. Despite improvements in network technology, data centers cannot guarantee acceptable transfer rates and response times, which may be a critical requirement for many applications. Furthermore, Internet of Things devices at the edge constantly consume data coming from the cloud, forcing entities, such as, for example, enterprises, companies, organizations, institutions, agencies, etc., to build content delivery networks to decentralize data and service provisioning, leveraging physical proximity to end users.

Edge computing moves the computation away from data centers towards the edge of the network, exploiting Internet of Things devices (namely, edge devices), such as, for example, smart devices (e.g., smart phones, smart televisions, smart watches, smart glasses, smart vehicles, smart appliances, smart sensors, etc.), mobile phones, network gateways and devices, etc., to perform tasks and provide services on behalf of the cloud. By moving tasks and services to the edge, it is possible to provide better response time and bandwidth availability.

In some applications and embodiments, edge computing may function as an optimization to cloud computing systems and work together with cloud computing. Scenarios in which edge computing is beneficial include situations that need low latency or where there are bandwidth constraints. Edge computing may also be important when Internet or cellular connections are spotty (e.g., intermittent). Cloud computing, in contrast, usually takes a more dominant position when actions require significant computing power to effectively manage vast data volumes from machines. However, cloud computing and edge computing may be both desirable for many industrial operations to gain the most value from today's sophisticated, varied, and large volume of data. The combination may provide flexibility for industries or server providers to manage and process data from edge devices at the edge, in the cloud, or a combination of the two to achieve optimal operation.

In an embodiment, one or more components of the system can employ hardware and/or software to solve problems that are highly technical in nature (e.g., instructing the first and second edge devices to transfer the task data from the first local storage of the first edge device to a second local storage of the second edge device). These solutions are not abstract and cannot be performed as a set of mental acts by a human due to the processing capabilities needed to facilitate edge device task management, for example. Further, some of the processes performed may be performed by a specialized computer for carrying out defined tasks related to identifying task attributes. For example, a specialized computer can be employed to carry out tasks related to edge device task management or the like. Implementation of embodiments of the invention may take a variety of forms, and exemplary implementation details are discussed subsequently with reference to the Figures.

It should be noted that in the drawings, like numbering represents like elements. Repetitive description of like elements employed in other embodiments described herein are omitted for sake of brevity.

Referring now to FIG. 1, a schematic illustration of a computing environment of a network of data processing systems in which illustrative embodiments may be implemented is depicted. The network data processing system 100 is a network of computers, data processing systems, and other devices in which the illustrative embodiments may be implemented. The network data processing system 100 contains a network 102, which is the medium used to provide communications links between the computers, data processing systems, and other devices connected together within the network data processing system 100. The network 102 may include connections, such as, for example, wire communication links, wireless communication links, fiber optic cables, and the like.

In the depicted example, a server 104 and a server 106 connect to the network 102, along with a storage 108 and edge devices 110. The server 104 and the server 106 are server computers with high-speed connections to the network 102. In addition, the server 104 and the server 106 are application programming interface servers that provide task management services for edge devices 110. For example, the server 104 and the server 106 may manage tasks by edge devices 110 using dynamic task data transfer across clusters of edge devices based on attributes of tasks. The tasks may be any type of task capable of being performed by the edge devices 110. The edge devices 110 represent a plurality of different types of edge devices in an edge computing framework and may include, for example, network computers, network devices, smart devices, and etc. Also, it should be noted that the server 104 and the server 106 may each represent multiple computing nodes in one or more cloud environments. Additionally, it should be noted that the server 104 and the server 106 may represent a single application programming interface server that provides task management services for edge devices 110.

A client 112, a client 114, and a client 116 also connect to network 102. The clients 112, 114, and 116 are clients of the server 104 and the server 106. In this example, the clients 112, 114, and 116 are shown as desktop or personal computers with wire communication links to the network 102. However, it should be noted that the clients 112, 114, and 116 are examples only and may represent other types of data processing systems, such as, for example, laptop computers, handheld computers, mobile phones, gaming devices, and the like, with wire or wireless communication links to the network 102. Users of the clients 112, 114, and 116 may utilize the clients 112, 114, and 116 to request to transfer task data of different types of tasks by the server 104 and the server 106.

The storage 108 is a network storage device capable of storing any type of data in a structured format or an unstructured format. In addition, the storage 108 may represent a plurality of network storage devices comprising a set of data stores. Further, the storage 108 may store identifiers and network addresses for a plurality of servers, identifiers and network addresses for a plurality of edge devices, edge device cluster metadata, task identifiers, task attributes, etc. Furthermore, the storage 108 may store other types of data, such as authentication or credential data that may include usernames, passwords, and biometric data associated with system administrators and users, for example.

In addition, it should be noted that the network data processing system 100 may include any number of additional servers, edge devices, clients, storage devices, and other devices not shown. Program codes located in the network data processing system 100 may be stored on a computer readable storage medium and downloaded to a computer or other data processing device for use. For example, program code may be stored on a computer readable storage medium on the server 104 and downloaded to the edge devices 110 over the network 102 for use on the edge devices 110.

In the depicted example, the network data processing system 100 may be implemented as a number of different types of communication networks, such as, for example, an internet, an intranet, a wide area network, a metropolitan area network, a local area network, a telecommunications network, or any combination thereof. FIG. 1 is intended as an example only, and not as an architectural limitation for the different illustrative embodiments.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
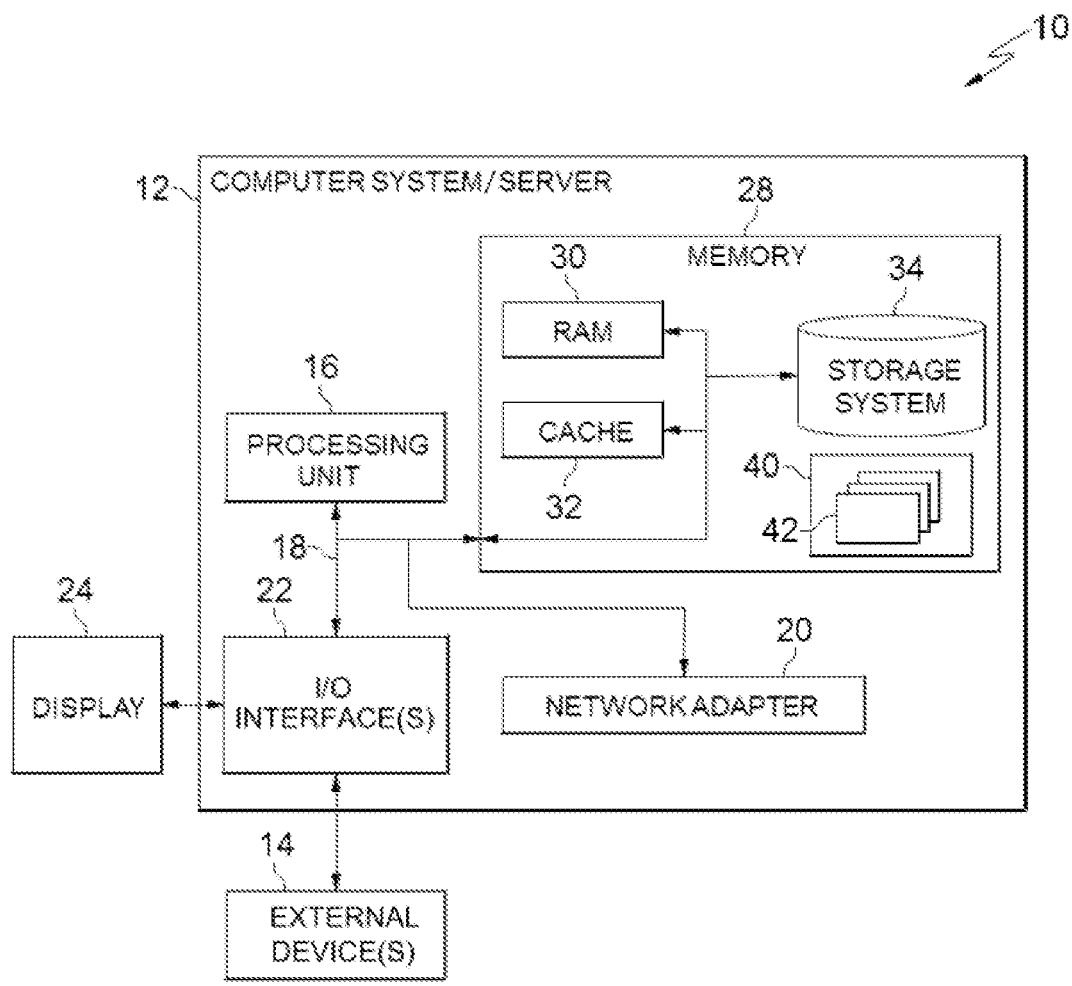
FIG. 2 depicts a cloud computing node, according to an embodiment of the invention.

Referring now to FIG. 2, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 3:
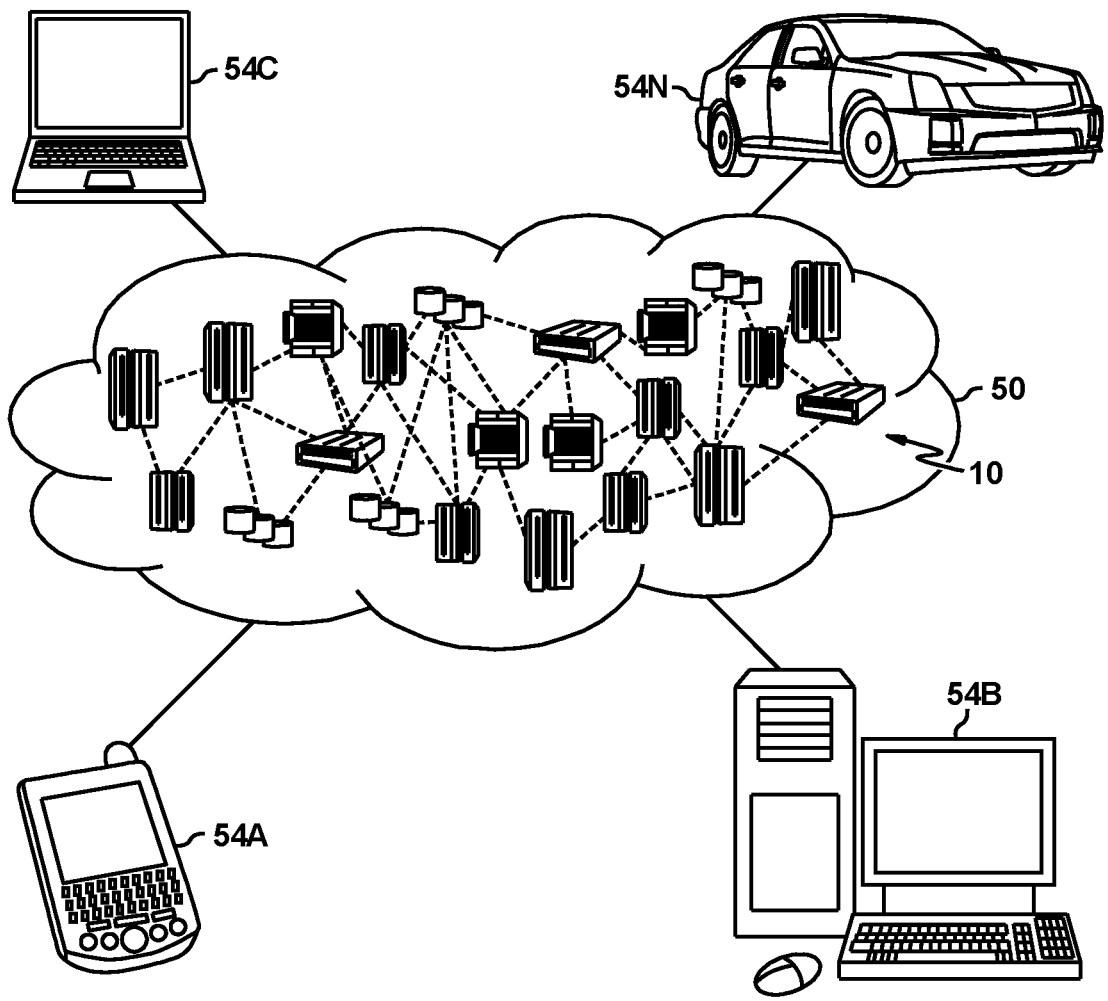
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
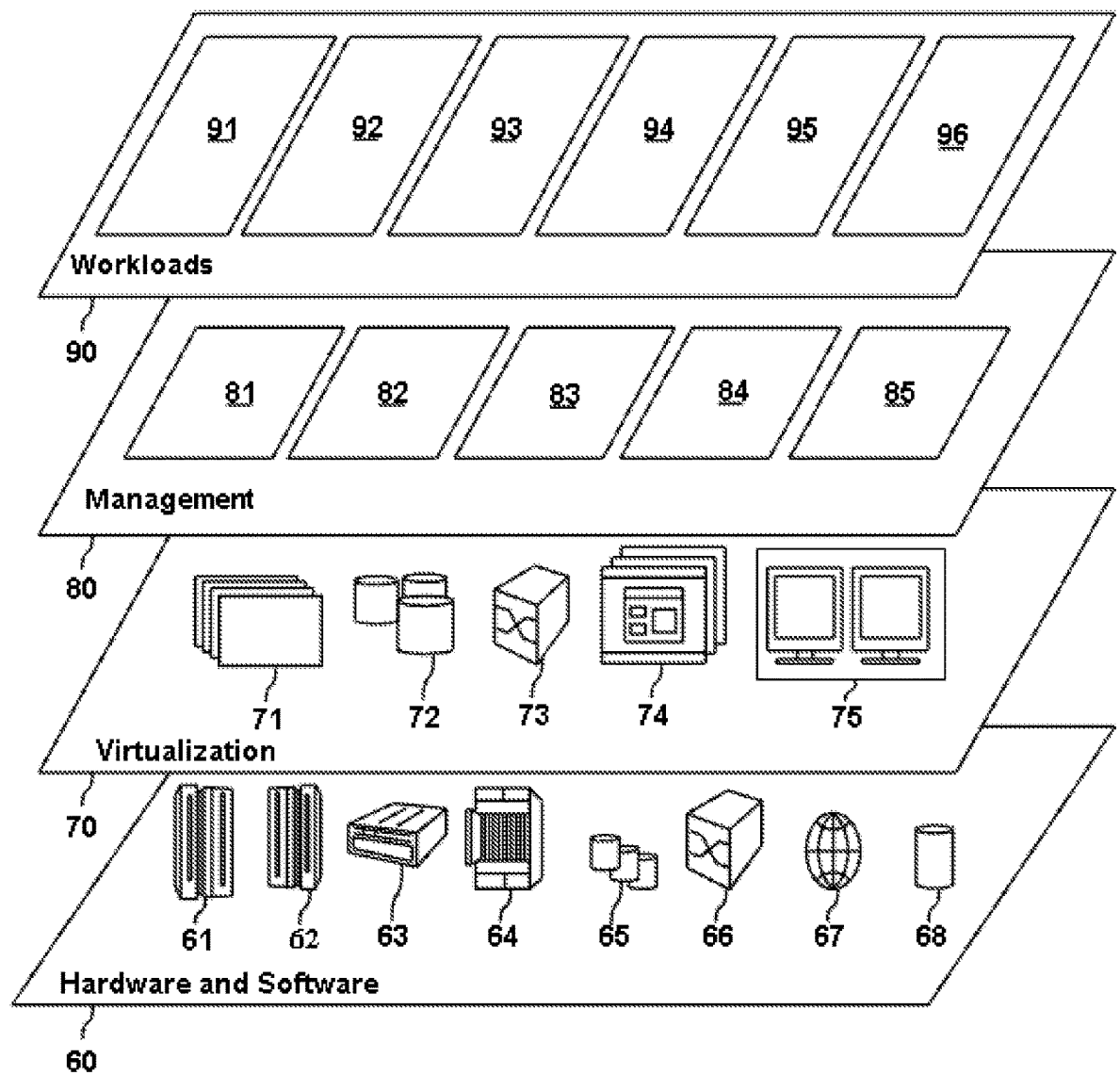
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and task data management 96.

Figure 5:
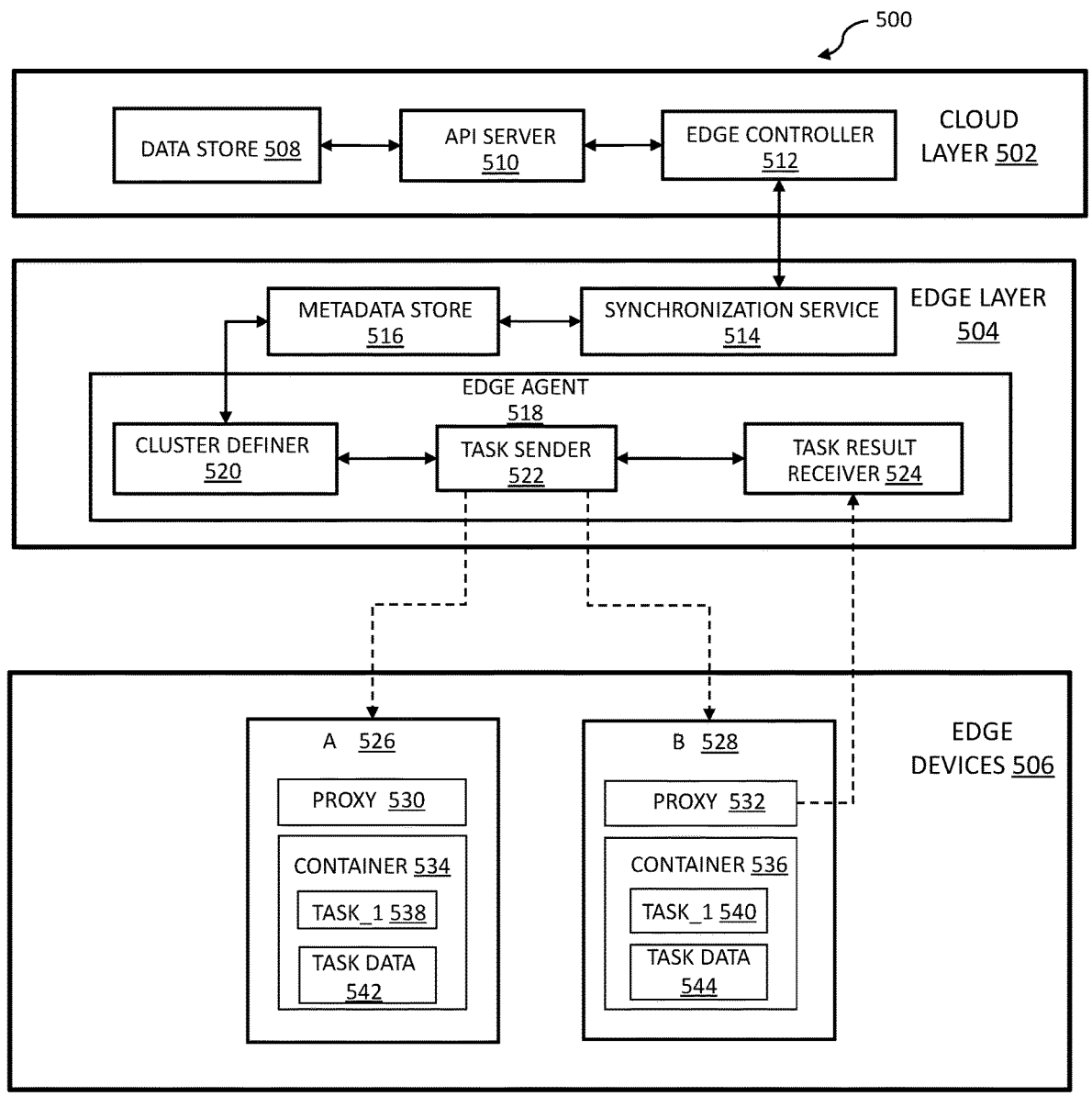
FIG. 5 depicts a diagram illustrating an example of an existing task management system, according to an embodiment of the invention.

With reference now to FIG. 5, a diagram illustrating an example of an existing task management system 500 is depicted in accordance with some embodiments. The task management system 500 may be implemented in a network of data processing systems, such as the network data processing system 100 in FIG. 1, or a cloud computing environment, such as the cloud computing environment in FIG. 4.

In this example, the task management system 500 includes a cloud layer 502, an edge layer 504, and edge devices 506. The cloud layer 502 may be, for example, the cloud computing environment in FIG. 4. The cloud layer 502 includes a data store 508, an application programming interface (API) server 510, and an edge controller 512. The data store 508 may be, for example, the storage system 34 in FIG. 2, and includes, for example, edge device task management data. The API server 510 may be, for example, the server 12 in FIG. 2, or a cloud computing node 10 in FIG. 3. The API server 510 receives user requests for performing tasks from client devices via a network. The API server 510 interacts with and manages edge devices 506 to perform the requested tasks through the edge controller 512 and the edge layer 504. The edge controller 512 is configured to connect to the edge layer 504 in the edge computing framework. In addition, the edge controller 512 collects and collates data from the edge devices 506 through the edge layer 504, transmits data to and accepts instructions from the API server 510 through the edge layer 504 to execute across all or clusters of the edge devices 506.

The edge layer 504 is configured to connect devices locally. In addition, the edge layer 504 manages data collection and connection to the API server 510. The edge layer 504 is also configured to handle outages and storing and forwarding data. The edge layer 504 includes synchronization service 514, a metadata store 516, and an edge agent 518. The synchronization service 514 is configured to synchronize data to the API server 510 through the edge controller 512. The metadata store 516 contains metadata defining different clusters of edge devices included in the edge devices 506. The metadata store 516 may retrieve the edge device cluster metadata from the data store 508. The edge agent 518 communicates with the edge devices 506 using a cluster definer 520, a task sender 522, and a task result receiver 524. The cluster definer 520 defines the different clusters of edge devices using information in the metadata store 516. The task sender 522 assigns and sends tasks to respective edge devices based on corresponding task attributes, resources required by tasks and resources provided by edge devices. The task result receiver 524 receives task status and results of running tasks on the edge devices 506.

The edge devices 506 may be, for example, a detector, a video camera, a sensor, etc., and may include any type and combination of edge devices. In this example, the edge devices 506 include an edge device "A" 526 and an edge device "B" 528. However, it should be noted that the edge devices 506 may include any number of edge devices. Also, the edge device A 526 and the edge device B 528 include a proxy 530 and a proxy 532, respectively. Proxies 530 and 532 provide communication between the edge devices 506 and the edge agent 518. In addition, the edge device A 526 and the edge device B 528 include a container 534 and a container 536, respectively. The containers 534 and 536 run the tasks sent to corresponding edge devices 506, and store task data 542 and 544 inside of corresponding containers.

In some scenarios, if the container 534 in the edge device "A" 526, which receives a task_1 538 from the task sender 522 and runs the task_1 538 within the container 534, is crashed, the task data 542 inside the container 534 will be lost. The edge agent 518, after receiving information indicating that the container 534 is crashed, may find another edge device, such as the edge device "B" 528, to run a task_1 540 instead. Since the task data 542 inside the container 534 is lost, the container 536 in the edge device "B" 528, after receiving instruction of running the task_1 540 from the task sender 522, has to run the task_1 540 from the beginning and save new task data 544 inside the container 536. For example, if the edge devices 526 and 528 are video cameras, the containers 534 and 536 are configured to collect and process video data, the task data 542 inside container 534 is the collected video data. When the container 536 in the edge device "B" 528 begins to run the task_1 538 in response to instruction from the edge agent 518 as the container 534 is crashed, the container 536 has to re-collect the video data 544 instead of using the collected task data 542 inside the container 534, which needs more time and resources to finish the task_1 540.

The following illustrative embodiments enable reasonable transferring task data from one edge device to another when the task cannot be performed due to overload or crash, so that the task may continue to run smoothly, and also ensure that work done by the original edge device is not wasted, so that utilization of edge devices can be improved.

Thus, the following illustrative embodiments increase edge layer capabilities by providing dynamic task data transferring mechanism. Furthermore, illustrative embodiments enhance the efficiency of the entire edge layer via a novel dynamic task data transferring process.

Figure 6:
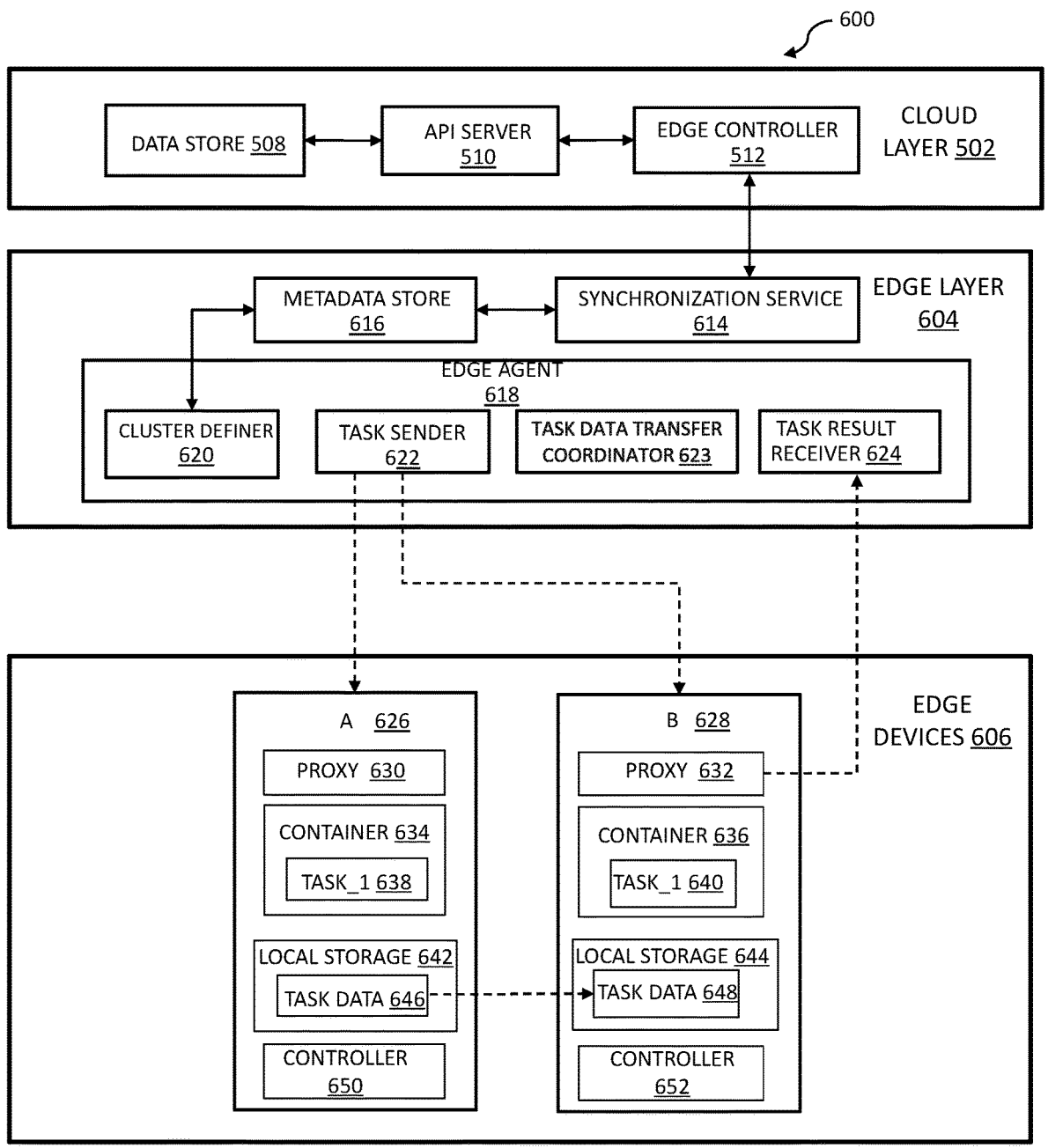
FIG. 6 depicts a diagram illustrating an example of a proposed task management system, according to an embodiment of the invention.

With reference now to FIG. 6, a diagram illustrating an example of a proposed task management system 600 is depicted in accordance with some embodiments. Similar to FIG. 5, the task management system 600 may be implemented in a network of data processing systems, such as the network data processing system 100 in FIG. 1, or a cloud computing environment, such as the cloud computing environment in FIG. 4.

As shown in FIG. 6, the task management system 600 also includes the cloud layer 502, an edge layer 604, and edge devices 606. The cloud layer 502 may be, for example, the cloud computing environment in FIG. 4.

The edge layer 604 is configured to connect devices locally, manage data collection and connection to the API server 510, and handle outages and store and forward data. In addition, the edge layer 604 is also configured to transfer task data of a task from a first edge device (such as an edge device "A" 626) to a second edge device (such as an edge device "B" 628) when a container in the first edge device is overloaded or crashed. The edge layer 604 includes synchronization service 614, a metadata store 616, and an edge agent 618. The synchronization service 614 is configured to synchronize data to the API server 510 through the edge controller 512. A metadata store 616 contains metadata defining different clusters of edge devices included in edge devices 606. Metadata store 616 may retrieve the edge device cluster metadata from the data store 508. The edge agent 618 communicates with the edge devices 606 using a cluster definer 620, a task sender 622, a task data transferring coordinator 623 and a task result receiver 624. The cluster definer 620 defines the different clusters of edge devices using information in the metadata store 616. The task sender 622 assigns and sends tasks to respective edge devices based on corresponding task attributes, such as resources required by tasks, and resources provided by edge devices. The task result receiver 624 receives task status and results of running tasks on the edge devices 606. The task data transferring coordinator 623 coordinates task data transferring from the first edge device to the second edge device when the container running the task in the first edge device is overloaded or crashed.

The edge devices 606 may be, for example, a detector, a video camera, a sensor, etc., and may include any type and combination of edge devices. In this example, the edge devices 606 includes the edge device "A" 626 and the edge device "B" 628. However, it should be noted that the edge devices 606 may include any number of edge devices. Also, the edge device "A" 626 and the edge device "B" 628 include a proxy 630 and a proxy 632, respectively. The proxies 630 and 632 provide communication between the edge devices 606 and the edge agent 618. In addition, the edge device "A" 626 and the edge device "B" 628 include a container 634 and a container 636, respectively. The containers 634 and 636 run the tasks sent to corresponding edge devices 606, and store task data to into corresponding local storage 642 and 644 respectively, which are outside corresponding containers 634 and 636, by controller 650 and 652.

In an embodiment, when the edge agent 618 receives a request from the cloud layer 502 to run a task, such as a task_1 638, on an edge device of the cluster of edge devices defined by cluster definer 620, the task sender 622 may select a first edge device, such as the edge device "A" 626 from the cluster of edge devices. Then, the task sender 622 may send the task_1 638 to the first edge device. At the edge device layer 604, the container 634 in the edge device "A" 626 receives the task_1 638 from the task sender 622 and runs the task_1 638 within thereof. Task data 646 of the task_1 638 is stored in a local storage 642 in the edge device "A" 626 but outside the container 634. If the container 634 is overloaded or crashed, then the task data 646 will not be lost since the edge device "A" 626 is still functioning properly. But the task result receiver 624 in the edge agent 618 may receive an indicator indicating that the container 634 is overloaded or crashed (i.e., an error notification corresponding to the container (e.g., container status)), then the task sender 622 may find another edge device, such as the edge device "B" 628, to run a task_1 638 instead. Then, the task data transferring coordinator 623 may inform the controller 650, which is outside of the container 634 but inside the edge device "A" 626, of a communication address of the local storage 644 in the edge device "B" 628 and may also notify the controller 652, which is outside the container 636 but inside the edge device "B" 628, of a communication address of the local storage 642 in the edge device "A" 626. In response to receiving the above communication addresses, either the controller 650 or the controller 652 can initialize to transfer task data from the local storage 642 to the local storage 644. After the task data 646 in the local storage 642 has been transferred to the task data 648 in the local storage 644, either the controller 650 or the controller 652 may notify the task data transferring coordinator 623, which may then inform the task sender 622 to send a task_1 640 to the edge device "B" 628, in which the container 636 may use the transferred task data 646, i.e., task data 648, in the local storage 644 to continue to run task_1 640. Still, the container 636 may store further task data of the task_1 640 in the local storage 644. After the task_1 640 is finished, the proxy 632 may send the result to the task result receiver 624.

It should be noted that the task_1 638 or 640 is used as an example only and not as a limitation to illustrative embodiments. In other words, the task_1 638 or 640 may include any number of subtasks.

In some embodiment, when the container 636 continues to run the task_1 640 using the transferred task data 646, i.e., the task data 648, if the container 636 is also crashed or overloaded, then the edge agent 618 may receive another indicator indicating that the container 636 is crashed or overloaded. Also, the edge agent 618 may then select another edge device from the cluster of edge devices, and then start another data transferring process similar to the data transferring process between the edge device "A" 626 and the edge device "B" 628.

Still in the above example, if the edge devices 606 are video cameras, the containers 634-636 are configured to collect and process video data, then the task data 646 inside the container 634 is collected video data. When the container 636 in edge device "B" 628 begins to run the task_1 640 in response to instruction from the edge agent 618 as the container 634 is overloaded or crashed, the container 636 may reuse the transferred task data 646, i.e., task data 648, in the local storage 644, which saves time to finish task_1 640.

In an embodiment, metadata of a task may comprise task attributes, such as task ID, resource required (such as CPU, memory, etc.) etc. Edge device selection from the cluster of edge devices is partly based on these attributes. Specifically, the edge device selection is based on a determination that the resources required by the task is less than resources provided by a selected edge device. Those skilled in the art may understand that edge device selection can use any of existing methods.

In an embodiment, the task attributes may comprise an indicator indicating whether task data of the task should be transferred when the container running the task is overloaded or crashed. If the task attributes do not contain the indicator, the edge agent 618 may not transfer the task data from one edge device to another edge device when the container running the task is overloaded or crashed. If the indicator of the attributes of the task indicates the container running the task is crashed or overloaded, then the task data transferring process may be executed to transfer the task data of the task.

In an embodiment, the task data transferring between the edge device "A" 626 and the edge device "B" 628 is initialized by the edge device "A" 626. If the controller 650 in the edge device "A" 626 is informed to transfer the task data 646 of the task_1 638 from the local storage 642 to the local storage 644, then the task data 646 of the task_ 638 in the local storage 642 is sent to the communication address of the local storage 644. In an embodiment, the task data 646 may be encrypted for security purposes. In an embodiment, the address of a local storage of an edge device is a directory structure location of the edge device, such as/device/task_1.

Figure 7:
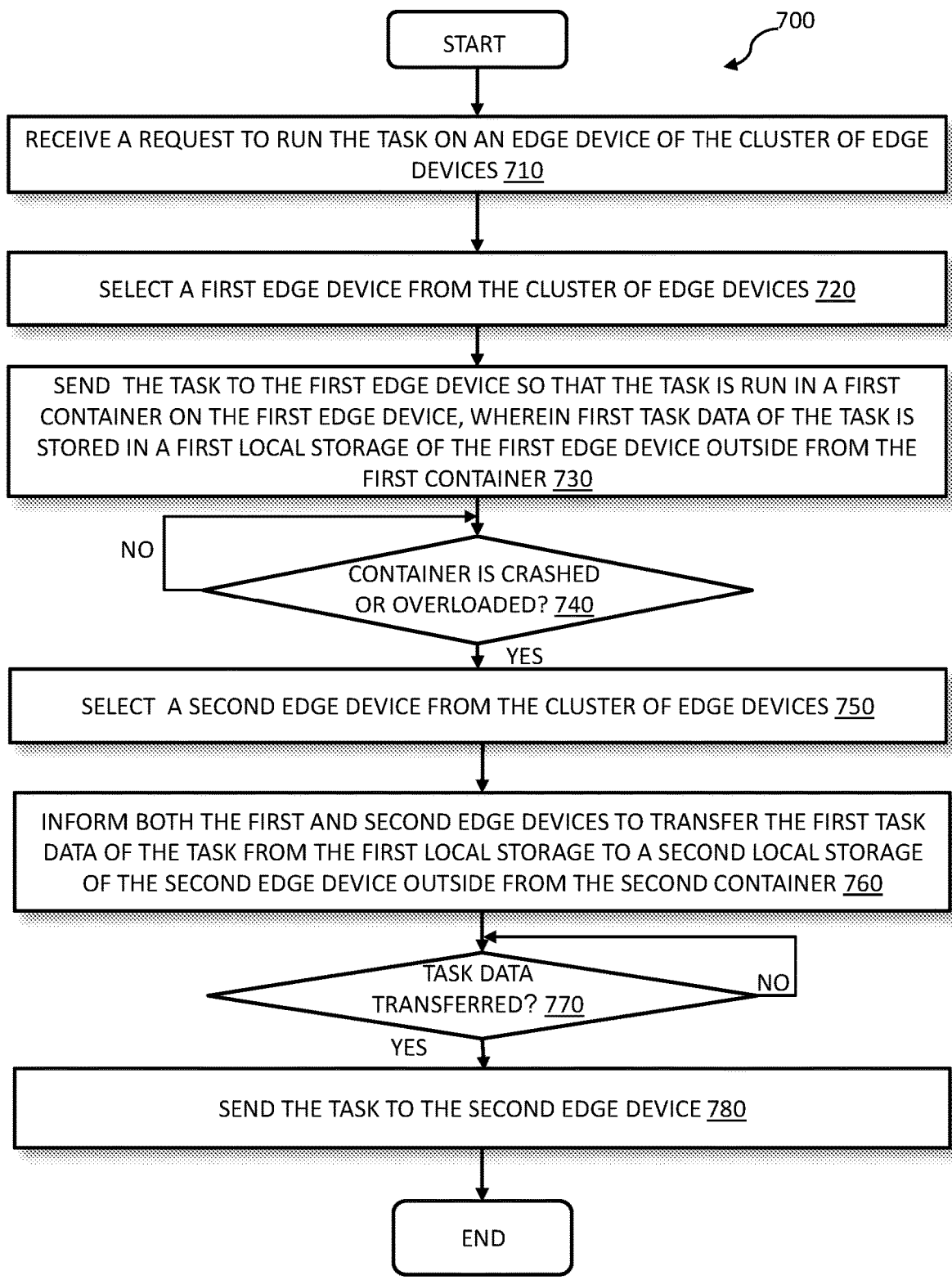
FIG. 7 provides a flowchart depicting an operational sequence, according to an embodiment of the invention.

Referring to FIG. 7, a flowchart of an exemplary method 700 for transferring task data from one edge device to another in edge computing is depicted according to embodiments of the present disclosure. The method 700 may be implemented by the edge agent 618, or other suitable computer/computing systems. For ease of understanding, the method 700 will be described with reference to FIG. 6.

At 710, the edge agent 618 receives a request to run a task (such as task_1 638) on an edge device of a cluster of edge devices. In an embodiment, information of the task may comprise task attributes, such as task ID, resource required (such as CPU, memory, etc.) and the like. In an embodiment, the task attributes may comprise an indicator indicating whether the task need to transfer task data when a container running the task is overloaded or crashed. If the task attributes do not contain the indicator, the edge agent 618 may not transfer the task data from one edge device to another edge device. Only when the indicator of the attributes of the task indicates to transfer the task data of the task, and a container running the task is crashed or overloaded, the method 700 may be executed.

At 720, the edge agent 618 selects a first edge device (such as the edge device "A" 626) from the cluster of edge devices. Edge device selection from the cluster of edge devices is partly based on the task attributes. Specifically, the edge device selection is based on a determination that the resources required by the task is less than resources provided by a selected edge device. Those skilled in the art may understand that edge device selection can use any existing methods.

At 730, the edge agent 618 sends the task to the first edge device so that the task is run in a first container on the first edge device, wherein task data of the task is stored in a first local storage of the first edge device outside the first container.

At 740, the edge agent 618 determines whether an indicator indicating the first container on the first edge device is crashed or overloaded is received. The indicator may be sent by the proxy 630 in the edge device "A" 626.

At 750, in response to receiving an indicator indicating the first container on the first edge device is crashed or overloaded, the edge agent 618 selects a second edge device from the cluster of edge devices based on task attributes. In an embodiment, the selecting the second edge device is based on a determination that the resources required by the task is less than resources provided by the second edge device.

At 760, the edge agent 618 instructs both the first and second edge devices to transfer the task data from the first local storage to a second local storage of the second edge device outside the second container.

At 770, the edge agent 618 receives a notification indicating that the task data has been transferred from the first local storage to the second local storage.

At 780, in response to receiving a notification indicating that the task data of the task has been transferred from the first local storage to the second local storage, the edge agent 618 sends the task to the second edge device. In an embodiment, a second container on the second edge device may continue to run the task based on the transferred task data. In an embodiment, in the method 700, the edge agent 618 may further receive execution results of the task from the second edge device. Then the process ends.

In an embodiment, the second container continues to run the task using the transferred task data in the second local storage and stores further task data of the task in the second local storage.

In an embodiment, if the edge agent 618 receives another indicator indicating the second container on the second edge device is crashed or overloaded, then the edge agent 618 can select a third edge device from the cluster of edge devices. Additionally, the edge agent 618 can inform both the second and third edge devices to transfer the task data and the further task data from the second local storage to a third local storage of the third edge device outside a third container to run the task. Also, in response to receiving another notification notifying that the task data and the further task data have been transferred from the second local storage to the third local storage, the edge agent 618 sends the task to the third edge device so that a third container on the third device continues to run the task.

In an embodiment, in response to being informed to transfer the task data of the task from the first local storage to the second local storage, the first edge device sends the task data of the task in the first local storage to the second local storage.

It should be noted that the method 700 of transferring task data from one edge device to another in edge computing according to embodiments of the present disclosure could be implemented by computer system/server 12 of FIG. 2. It also should be noted that the method 700 of transferring task data from one edge device to another in edge computing according to embodiments of the present disclosure could be implemented in any computer system. In an embodiment, the method 700 can be implemented in a cloud computing environment, and respective steps in the method 700 can be implemented in respective containers/POD in the cloud computing environment.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for edge device task management, the computer-implemented method comprising:
   receiving, by one or more processors, an indicator corresponding to a first container running a task on a first edge device of a cluster of edge devices, wherein the indicator indicates a crash status of the first container, and wherein task data of the task is stored in a first local storage of the first edge device;
   selecting, by one or more processors, a second edge device from the cluster of edge devices, wherein a second container on the second edge device is to run the task;
   instructing, by one or more processors, the first edge device and the second edge device to transfer the task data from the first local storage of the first edge device to a second local storage of the second edge device;
   in response to receiving a notification that indicates the task data has been transferred from the first local storage to the second local storage, sending, by one or more processors, the task to the second container of the second edge device; and
   reusing, by one or more processors, the transferred task data stored on the second local storage of the second edge device to resume running the task from a point the first edge device completed processing.

2. The method of claim 1, further comprising:
   in response to instructing the first edge device to transfer the task data of the task from the first local storage to the second local storage, sending, by one or more processors, the task data of the task in the first local storage to the second local storage.

3. The method of claim 1, the method further comprising:
   storing, by one or more processors, further task data of the task in the second local storage, wherein the second container of the second edge device continues to run the task using the transferred task data in the second local storage.

4. The method of claim 3, further comprising:
   in response to receiving an additional indicator corresponding to the second container of the second edge device, wherein the additional indicator indicates an error status of the second container, selecting, by one or more processors, a third edge device from the cluster of edge devices;
   instructing, by one or more processors, the second edge device and the third edge device to transfer the task data and the further task data from the second local storage of the second edge device to a third local storage of the third edge device; and
   in response to receiving an additional notification that indicates the task data and the further task data have been transferred from the second local storage to the third local storage, sending, by one or more processors, the task to a third container of the third edge device, wherein the third container continues to run the task based on the transferred task data and the further task data.

5. The method of claim 3, further comprising:
receiving, by one or more processors, execution results of the task from the second edge device.

6. The method of claim 3, further comprising:
   determining, by one or more processors, whether to transfer the task data of the task based at least in part on attributes of the task, wherein the attributes of the task include required resources to run the task.

7. The method of claim 6, further comprising:
   in response to determining that the required resources of the task are less than available resources of the second edge device, selecting, by one or more processors, the second edge device to run the task.

8. A computer program product for edge device task management, the computer program product comprising one or more computer readable storage devices and collectively stored program instructions on the one or more computer readable storage devices, the stored program instructions comprising:
   program instructions to receive an indicator corresponding to a first container running a task on a first edge device of a cluster of edge devices, wherein the indicator indicates a crash status of the first container, and wherein task data of the task is stored in a first local storage of the first edge device;
   program instructions to select a second edge device from the cluster of edge devices, wherein a second container on the second edge device is to run the task;
   program instructions to instruct the first edge device and the second edge device to transfer the task data from the first local storage of the first edge device to a second local storage of the second edge device;
   in response to receiving a notification that indicates the task data has been transferred from the first local storage to the second local storage, program instructions to send, the task to the second container of the second edge device; and
   program instructions to reuse the transferred task data stored on the second local storage of the second edge device to resume running the task from a point the first edge device completed processing.

9. The computer program product according to claim 8, the stored program instructions further comprising:
   in response to instructing the first edge device to transfer the task data of the task from the first local storage to the second local storage, program instructions to send the task data of the task in the first local storage to the second local storage.

10. The computer program product according to claim 8, the stored program instructions further comprising:
    program instructions to store further task data of the task in the second local storage, wherein the second container of the second edge device continues to run the task using the transferred task data in the second local storage.

11. The computer program product according to claim 10, the stored program instructions further comprising:
    in response to receiving an additional indicator corresponding to the second container of the second edge device, wherein the additional indicator indicates an error status of the second container, program instructions to select a third edge device from the cluster of edge devices;
    program instructions to instruct the second edge device and the third edge device to transfer the task data and the further task data from the second local storage of the second edge device to a third local storage of the third edge device; and
    in response to receiving an additional notification that indicates the task data and the further task data have been transferred from the second local storage to the third local storage, program instructions to send the task to a third container of the third edge device, wherein the third container continues to run the task based on the transferred task data and the further task data.

12. The computer program product according to claim 10, the stored program instructions further comprising:
program instructions to receive execution results of the task from the second edge device.

13. The computer program product according to claim 10, the stored program instructions further comprising:
program instructions to determine whether to transfer the task data of the task based at least in part on attributes of the task, wherein the attributes of the task include required resources to run the task.

14. The computer program product according to claim 13, the stored program instructions further comprising:
in response to determining that the required resources of the task are less than available resources of the second edge device, program instructions to select the second edge device to run the task.

15. A computer system for edge device task management, the computer system comprising:
one or more computer processors;
one or more computer readable storage devices; and
stored program instructions on the one or more computer readable storage devices for execution by the one or more computer processors, the stored program instructions comprising:
program instructions to receive an indicator corresponding to a first container running a task on a first edge device of a cluster of edge devices, wherein the indicator indicates a crash status of the first container, and wherein task data of the task is stored in a first local storage of the first edge device;
program instructions to select a second edge device from the cluster of edge devices, wherein a second container on the second edge device is to run the task;
program instructions to instruct the first edge device and the second edge device to transfer the task data from the first local storage of the first edge device to a second local storage of the second edge device;
in response to receiving a notification that indicates the task data has been transferred from the first local storage to the second local storage, program instructions to send, the task to the second container of the second edge device; and
program instructions to reuse the transferred task data stored on the second local storage of the second edge device to resume running the task from a point the first edge device completed processing.

16. The computer system according to claim 15, the stored program instructions further comprising:
in response to instructing the first edge device to transfer the task data of the task from the first local storage to the second local storage, program instructions to send the task data of the task in the first local storage to the second local storage.

17. The computer system according to claim 15, the stored program instructions further comprising:
program instructions to store further task data of the task in the second local storage, wherein the second container of the second edge device continues to run the task using the transferred task data in the second local storage.

18. The computer system according to claim 17, the stored program instructions further comprising:
in response to receiving an additional indicator corresponding to the second container of the second edge device, wherein the additional indicator indicates an error status of the second container, program instructions to select a third edge device from the cluster of edge devices;
program instructions to instruct the second edge device and the third edge device to transfer the task data and the further task data from the second local storage of the second edge device to a third local storage of the third edge device; and
in response to receiving an additional notification that indicates the task data and the further task data have been transferred from the second local storage to the third local storage, program instructions to send the task to a third container of the third edge device, wherein the third container continues to run the task based on the transferred task data and the further task data.

19. The computer system according to claim 17, the stored program instructions further comprising:
program instructions to determine whether to transfer the task data of the task based at least in part on attributes of the task, wherein the attributes of the task include required resources to run the task.

20. The computer system according to claim 19, the stored program instructions further comprising:
in response to determining that the required resources of the task are less than available resources of the second edge device, program instructions to select the second edge device to run the task.

* * * * *